(12) United States Patent
Han et al.

(10) Patent No.: US 9,229,265 B2
(45) Date of Patent: Jan. 5, 2016

(54) METHOD OF PREPARING MONODISPERSE PARTICLE, MONODISPERSE PARTICLE PREPARED BY USING THE METHOD, AND TUNABLE PHOTONIC CRYSTAL DEVICE USING THE MONODISPERSE PARTICLE

(75) Inventors: Moon Gyu Han, Yongin-si (KR); Chang Gyun Shin, Anyang-si (KR); HongShik Shim, Seoul (KR); Seog-jin Jeon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/517,789

(22) Filed: Jun. 14, 2012

(65) Prior Publication Data

US 2013/0044365 A1    Feb. 21, 2013

(30) Foreign Application Priority Data

Aug. 18, 2011    (KR) .................. 10-2011-0082342

(51) Int. Cl.
| | |
|---|---|
| *G02B 26/00* | (2006.01) |
| *G02B 26/08* | (2006.01) |
| *G02F 1/29* | (2006.01) |
| *G02F 1/1335* | (2006.01) |
| *C08F 2/12* | (2006.01) |
| *G02B 1/00* | (2006.01) |
| *C08F 220/14* | (2006.01) |
| *B82Y 30/00* | (2011.01) |
| *B82Y 40/00* | (2011.01) |

(52) U.S. Cl.
CPC ............ *G02F 1/133514* (2013.01); *C08F 2/12* (2013.01); *C08F 220/14* (2013.01); *G02B 1/005* (2013.01); *B82Y 30/00* (2013.01); *B82Y 40/00* (2013.01); *G02F 2202/32* (2013.01); *G02F 2203/62* (2013.01)

(58) Field of Classification Search
USPC .......... 359/237, 242, 290–292, 295, 296, 298
See application file for complete search history.

(56) References Cited

U.S. PATENT DOCUMENTS

| | | | |
|---|---|---|---|
| 7,008,567 | B2 | 3/2006 | Foulger et al. |
| 7,364,673 | B2 | 4/2008 | Arsenault et al. |
| 7,459,283 | B2 | 12/2008 | Wertz et al. |
| 7,719,744 | B2 | 5/2010 | Won et al. |

(Continued)

FOREIGN PATENT DOCUMENTS

| | | |
|---|---|---|
| JP | 10-130021 A | 5/1998 |
| JP | 11-217722 | 10/1999 |

(Continued)

OTHER PUBLICATIONS

Office Action for corresponding U.S. Appl. No. 13/477,311 dated Jun. 5, 2013.

(Continued)

*Primary Examiner* — Joseph P Martinez
*Assistant Examiner* — Brandi Thomas
(74) *Attorney, Agent, or Firm* — Harness, Dickey & Pierce, P.L.C.

(57) ABSTRACT

A method of preparing a monodisperse particle may include mixing at least two types of monomers in a solvent, placing an initiator in the solvent, and forming a particle having a copolymer shape by polymerizing the at least two types of monomers. The particle may have a size controlled by a content of the at least two types of monomers.

16 Claims, 15 Drawing Sheets

(56) References Cited

U.S. PATENT DOCUMENTS

| | | | |
|---|---|---|---|
| 7,741,378 B2 * | 6/2010 | Cui | 521/60 |
| 8,076,846 B2 | 12/2011 | Mizuno et al. | |
| 2002/0173610 A1 | 11/2002 | Aert et al. | |
| 2003/0162393 A1 | 8/2003 | Sato et al. | |
| 2005/0185254 A1 * | 8/2005 | Moon et al. | 359/321 |
| 2006/0182968 A1 * | 8/2006 | Yoshida et al. | 428/402 |
| 2007/0201124 A1 | 8/2007 | Whitesides et al. | |
| 2008/0230752 A1 | 9/2008 | Bower et al. | |
| 2009/0034051 A1 * | 2/2009 | Arsenault et al. | 359/290 |
| 2009/0202714 A1 * | 8/2009 | Mandzy et al. | 427/164 |
| 2009/0326081 A1 * | 12/2009 | Irgum et al. | 521/38 |
| 2011/0068676 A1 * | 3/2011 | Jeon et al. | 313/483 |
| 2012/0139960 A1 | 6/2012 | Shin et al. | |

FOREIGN PATENT DOCUMENTS

| | | | |
|---|---|---|---|
| KR | 10-2007-0041027 A | 4/2007 | |
| KR | 10-2009-0019781 A | 2/2009 | |
| KR | 10-2010-0034499 A | 4/2010 | |
| WO | WO-2009/065639 A1 | 5/2009 | |

OTHER PUBLICATIONS

European Search Report mailed Dec. 17, 2012, issued in European Application No. 12181081.6.

Hung-Wen Su, et al., "Photosensitive High-Refractive-Index Poly(acrylic acid)-*graft*-Poly(ethylene glycol methacrylate) Nanocrystalline Titania Hybrid Films," *Macromol. Chem. Phys.*, V. 209, pp. 1778-1786 (2008).

Changli Lu, et al., "High refractive index organic-inorganic nanocomposites: design, synthesis and application," *J. Mater. Chem.*, vol. 19, pp. 2884-2901 (2009).

Office Action for corresponding U.S. Appl. No. 13/477,311 dated Oct. 1, 2013.

I. Hosein, et al., "Homogenous, Core-Shell and Hollow-Shell ZnS Colloid-Based Photonic Crystals," Langmuir, vol. 23, pp. 2892-2897 (2007).

U.S. Notice of Allowance for corresponding U.S. Appl. No. 13/477,311 issued Jul. 8, 2015.

* cited by examiner

METHOD OF PREPARING MONODISPERSE PARTICLE, MONODISPERSE PARTICLE PREPARED BY USING THE METHOD, AND TUNABLE PHOTONIC CRYSTAL DEVICE USING THE MONODISPERSE PARTICLE

CROSS-REFERENCE TO RELATED APPLICATIONS

This application claims the benefit of Korean Patent Application No. 10-2011-0082342, filed on Aug. 18, 2011, in the Korean Intellectual Property Office, the disclosure of which is incorporated herein in its entirety by reference.

BACKGROUND

1. Field

Example embodiments relate to methods of preparing monodisperse particles, monodisperse particles prepared by using the methods, and tunable photonic crystal devices using the monodisperse particles.

2. Description of the Related Art

Photonic crystals have a lattice structure in which two or more materials having different refractive indices are regularly arranged in a two-dimensional (2D) or three-dimensional (3D) shape. Photonic crystals having a lattice structure with a photonic bandgap through which light having a predetermined or given wavelength can be intercepted or transmitted, due to periodic distribution of refractive indices of the materials. For example, when the photonic bandgap of photonic crystals is formed in a visible light band and the frequency of light incident on the photonic crystals corresponds to the photonic bandgap, 99% or more of incident light should be reflected from, the photonic crystals. Contrary to this, most of the incident light having a frequency other than the photonic bandgap of the photonic crystals is transmitted through the photonic crystals.

Technologies for applying photonic crystals to a variety of electro-optical devices, e.g., wavelength filters or display devices, by adjusting the photonic bandgap of photonic crystals have been suggested. For example, it has been reported that stop band tuning is performed by controlling effective refractive indices of materials used in forming photonic crystals. However, in such stop band tuning methods, there is little change in refractive indices, and there is a limitation in a tuning range of a stop band. Thus, it is difficult to apply photonic crystals to display devices. As another method, a method of adjusting the photonic bandgap of photonic crystals by controlling a lattice distance of photonic crystals has been suggested. There are a number of well-known methods of controlling a lattice distance of photonic crystals, e.g., a method of encapsulating photonic crystals with a polymer matrix and using a phenomenon whereby the polymer matrix swells or deswells due to oxidation/reduction according to an electrical signal of the polymer matrix and compressing/stretching the polymer matrix, and a method of using a phenomenon whereby a polymer matrix swells or deswells because the polymer matrix reacts with temperature, humidity, or chemical and biological stimuli. However, in such methods, the speed of switching color is limited because the polymer matrix swells or deswells at a relatively low speed. Thus, there is a limitation in applying photonic crystals to display devices.

SUMMARY

Example embodiments provide methods of preparing monodisperse particles whereby the size of a monodisperse particle may be controlled in a simple manner, monodisperse particles prepared by using the methods, and tunable photonic crystal devices using the monodisperse particles.

Additional aspects will be set forth in part in the description which follows and, in part, will be apparent from the description, or may be learned by practice of example embodiments.

According to example embodiments, a method of preparing a monodisperse particle may include mixing at least two types of monomers in a solvent, placing an initiator in the solvent, and forming the monodisperse particle having a copolymer shape by polymerizing the at least two types of monomers. The particle may have a size controlled by a content of the at least two types of monomers.

The forming may form the particle to have a diameter in a range of about 50 to 200 nm. The forming may form the particle to constitute a colloid solution in the solvent, and a zeta-potential of the particle may be in a range of one of about −150 to −30 mV, and about 30 to 150 mV. The forming may form the particle as a colloidal crystal that is arranged on the solvent in one of a face-centered cubic (FCC) structure, a body-centered cubic (BCC) structure, and a close-packed hexagonal (HCP) structure.

The mixing may mix at least two of methyl methacrylates (MMA), ethyl methacrylates, butyl methacrylates, hydroxyethyl methacrylates, vinyl benzenes, vinyl toluenes, styrenes, acrylamides, N-isopropyl acrylamides, hydroxyethyl acrylamides, isobutylmethyl acrylamides, and combinations thereof. The mixing may mix the at least two types of monomers in a polar solvent. The placing may place one of ammonium persulfate (($NH_4$)$_2S_2O_8$), potassium persulfate ($K_2S_2O_8$), and sodium persulfate ($Na_2S_2O_8$) in the solvent. A surfactant may be added to the solvent. The adding may add one of an anionic surfactant, a cationic surfactant and a zwitterionic surfactant to the solvent.

According to example embodiments, a monodisperse particle prepared by using a method of preparing a monodisperse particle. The method may include mixing at least two types of monomers in a solvent, placing an initiator in the solvent, and forming the monodisperse particle having a copolymer shape by polymerizing the at least two types of monomers. The particle may have a size controlled by a content of the at least two types of monomers.

According to example embodiments, a tunable photonic crystal device may include a colloid solution including colloid particles dispersed therein, and electrodes configured to apply a voltage to the colloid particles. The colloid particles may constitute a photonic crystal, and a photonic stop band of the photonic crystal is continuously tuned in at least a visible light band according to the voltage applied to the electrodes.

The electrodes may be two electrodes spaced apart from each other, and the colloid solution may be between the two electrodes. A diameter of the colloid particles may be in a range of about 50 to 200 nm. The colloid particles may have a zeta-potential in a range of one of about −150 to −30 mV and about 30 to 150 mV. The photonic crystal may live one of a face-centered cubic (FCC) structure, a body-centered cubic (BCC) structure and a close-packed hexagonal (HCP) structure.

The colloid particles may be formed by polymerizing at least two types of monomers. A diameter of the colloid particles may be controlled based on a content of the at least two monomers. Each of the at least two types of monomers may be one of methyl methacrylates (MMA), ethyl methacrylates, butyl methacrylates, hydroxyethyl methacrylates, vinyl benzenes, vinyl toluenes, styrenes, acrylamides, N-isopropyl acrylamides, hydroxyethyl acrylamides, isobutylmethyl acrylamides, and combinations thereof. The colloid solution may include a polar solvent. The tunable photonic crystal device may be one of a tunable color filter having a visible light band as the photonic stop band, and a full-color reflection type display device that displays an arbitrary color in the visible light band.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
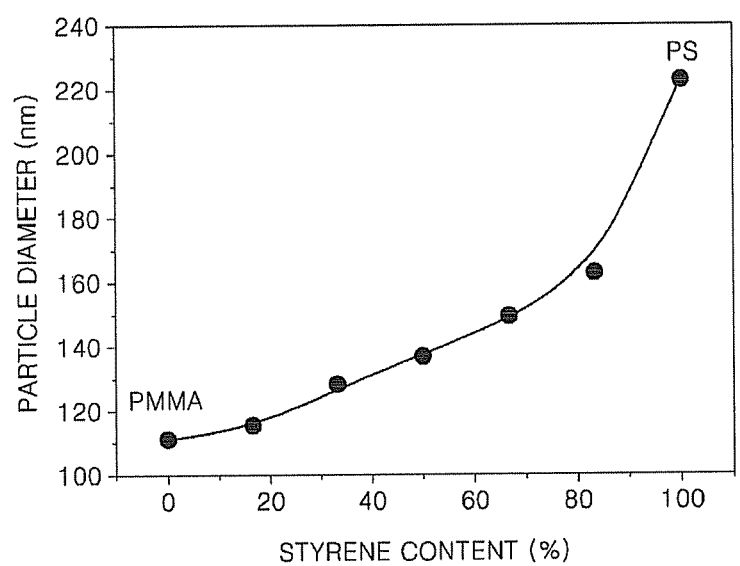
FIG. 1 is a graph showing a relationship between a feeding rate of initial monomers and a diameter of polystyrene/polymethylmethacrylate (PS/PMMA) particles when the PS/PMMA particles are prepared by using a method according to example embodiments.

Reference will now be made in detail to embodiments, examples of which are illustrated in the accompanying drawings, wherein like reference numerals refer to the like elements throughout. In this regard, example embodiments may have different forms and should not be construed as being limited to the descriptions set forth herein. Accordingly, example embodiments are merely described below, by referring to the figures, to explain aspects of the present description. In the drawings, the thicknesses of layers and regions are exaggerated for clarity. Like reference numerals throughout the detailed description denote like elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing exemplary embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

A method of preparing a monodisperse particle, according to example embodiments, may include a series of processes, e.g., adding a surfactant to a disperse medium and stirring the disperse medium with the surfactant, adding at least two types of monomers to the disperse medium at a predetermined or given feeding rate and stirring the disperse medium with the monomers, adding an initiator to the disperse medium, and polymerizing at least two types of monomers for a predetermined or given amount of time, thereby forming a colloid particle having a copolymer shape. The method may further include adjusting a feeding rate of the monomers to adjust a diameter of the colloid particle when initial monomers are added to the disperse medium. The colloid particle may be a monodisperse particle having a uniform diameter that is selected according to a content of monomers.

The diameter of the monodisperse particle may be controlled to have various sizes in the range of several nm to several μm, for example, 50 to 200 nm, by controlling the feeding rate of monomers, and a degree of dispersion of particle sizes may be uniform, e.g., within 5%.

Acrylate-based or methacrylate-based monomers, e.g., methyl methacrylates (MMA), ethyl methacrylates, butyl methacrylates or hydroxyethyl methacrylates, aromatics monomers, e.g., vinyl benzene, vinyl toluenes or styrene, acrylamide-based monomers, e.g., acrylamide, N-isopropyl acrylamides, hydroxyethyl acrylamide or isobutylmethyl acrylamides, or combinations thereof, e.g., copolymers, may be used. A dispersion medium/solvent may be a polar solvent. For example, the disperse medium/solvent may be deionized (DI) water, alcohol, ethylene glycol, propylene glycol or other well-known polar solvents. The surfactant may be an anionic surfactant, e.g., sodium dodecyl sulfate (SDS) surfactant, a cationic surfactant, and/or a zwitterionic surfactant. The initiator may be ammonium persulfate $((NH_4)_2S_2O_8)$, potassium persulfate $(K_2S_2O_8)$, and/or sodium persulfate $(Na_2S_2O_8)$.

A specific example of preparing a monodisperse particle will now be described below. After putting 100 ml of DI water in a flask, 0.1 g of SDS surfactant is added to the 100 ml of DI water and stirred. A total amount of 36 ml of a styrene/MMA monomer is added to the 100 ml of DI water and stirred for 30 minutes. The temperature of a reactor is raised to 80° C., and 0.0625 g of a potassium persulfate $(K_2S_2O_8)$ initiator that is dissolved in 10 ml of DI water is put in the reactor by reacting the SDS surfactant with the styrene/MMA monomer for 5 hours, thereby forming a polystyrene/polymethylmethacrylate (PS/PMMA) particle.

In the formation of the PS/PMMA particle as described above, a result of modifying a feeding rate of the styrene/MMA monomer from 0 to 100 and repeating the method of preparing the PS/PMMA particle is shown in FIGS. 1, 2, 3, and 4A through 4D.

FIG. 1 is a graph showing the relationship between the feeding rate of initial monomers (styrene/MMA) and a diameter of a PS/PMMA particle when the PS/PMMA particles are prepared by using a method according to example embodiments. Referring to FIG. 1, as a content of styrene increases, the diameter of the PS/PMMA particles increases. Thus, the diameter of the PS/PMMA particles may be adjusted in the range of approximately 110 to 220 nm according to the content of styrene. The leftmost side of FIG. 1 represents a case where the content of styrene is 0%, that is, a polymer formed of only MMA, e.g., PMMA is formed, and the rightmost side of FIG. 1 represents a case where the content of styrene is 100%, that is, a polymer formed of styrene, e.g., PS, is formed.

Figure 2:
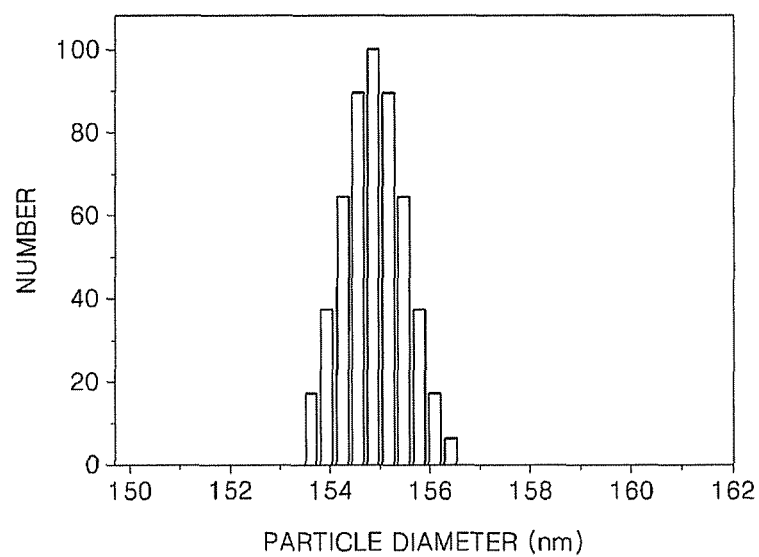
FIGS. 2 and 3 are graphs showing a result of measuring distribution of diameters of PS/PMMA particles by using dynamic light scattering when a content of styrene is 33.3% and 83.3%, respectively, when the PS/PMMA particles are prepared by using a method according to example embodiments.
Figure 3:
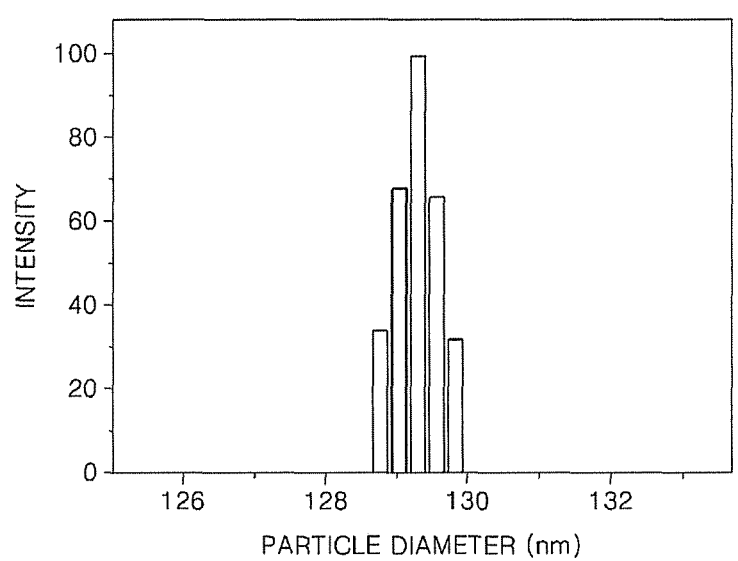
Figure 4A:
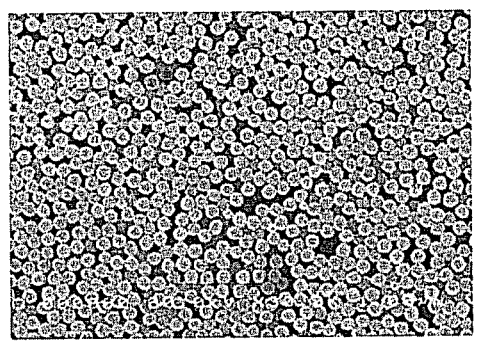
FIGS. 4A through 4D are scanning electron microscopy (SEM) morphology images of PS/PMMA particles when a content of styrene is 16.7%, 33.3%, 66.7%, and 83.3%, respectively.
Figure 4B:
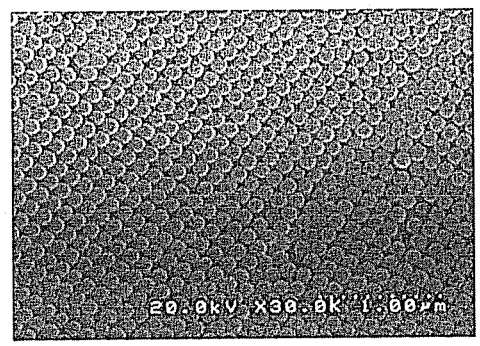
Figure 4C:
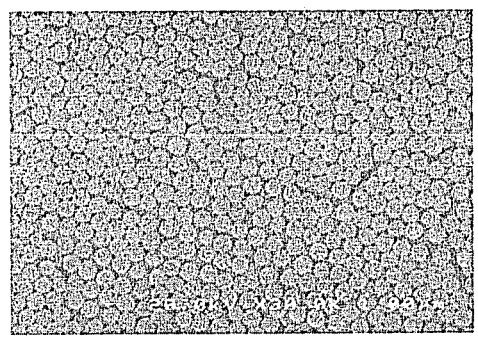
Figure 4D:
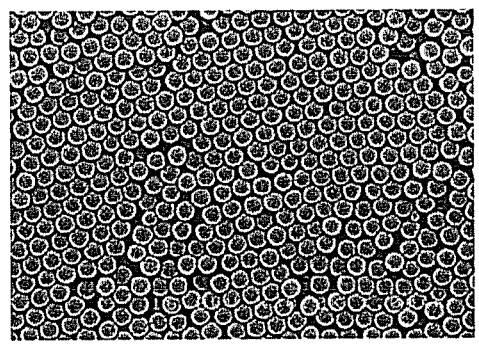

FIGS. 2 and 3 are graphs showing a result of measuring distribution of diameters of PS/PMMA particles by using dynamic light scattering when the content of styrene is 33.3% and 83.3%, respectively, when the PS/PMMA particles are prepared by using a method according to example embodiments. Referring to FIGS. 2 and 3, the diameter of the PS/PMMA particle is controlled by adjusting the feeding rate of the initial polymers so that a monodisperse particle having a degree of dispersion of particle sizes that is uniform, within 5%, may be formed.

In addition, FIGS. 4A through 4D are scanning electron microscopy (SEM) morphology images of PS/PMMA particles when the content of styrene is 16.7%, 33.3%, 66.7%, and 83.3%, respectively. Referring to FIGS. 4A through 4D, in the SEM morphology of the PS/PMMA particle, the size of the monodisperse particle is uniform and self-assembly of the monodisperse particle is appropriately performed even on a substrate. The distribution of the size of the PS/PMMA particle illustrated in FIGS. 4A through 4D coincides with the distribution of the size of the PS/PMMA particle illustrated in FIG. 2 or 3.

Because controlling the size of a submicrometer-scale particle is not easy according to the related art, a monodisperse colloid particle may be prepared of which the size is more easily controlled only by controlling the feeding rate of monomers when a colloid particle is formed as suggested in example embodiments.

Figure 5A:
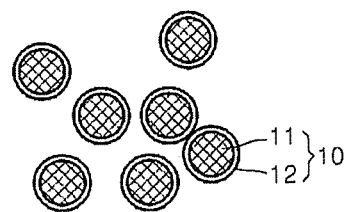
FIGS. 5A through 5C illustrate an arrangement of colloid particles prepared by using the methods described above.
Figure 5B:
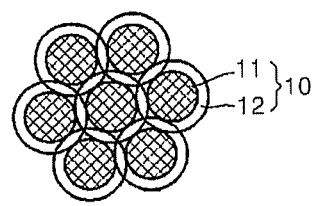
Figure 5C:
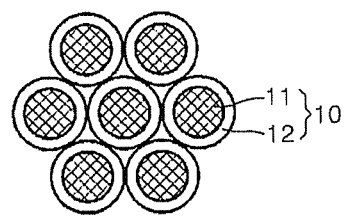

FIGS. 5A through 5C illustrate the arrangement of colloid particles prepared by using the methods described above. By performing the above-described processes, colloid particles having a surface that is charged with the same sign may be prepared. As illustrated in FIG. 5A, colloid particles 10 in a colloid solution are electrically charged due to dissociation of a polar group on the surface of the colloid particle and ion absorption. Thus, each of the colloid particles 10 includes a particle main body 11 and a charged area 12.

When the colloid particles 10 are initially formed, the colloid particles 10 are arranged in a disordered state. In example embodiments, the charged area 12 may include an electric double layer including a layer to which an opponent ion is absorbed and which is not appropriately moved and a layer that is spaced apart from the opponent ion by a relatively small distance and is appropriately moved.

A relatively small amount of an unreacted monomer and/or a surfactant in the colloid solution may be removed by using dialysis in DI water, by adding a monomer or by using an ion-exchange resin. When the relatively small amount of the unreacted monomer and/or the surfactant in the colloid solution is removed, the colloid particles 10 each having an electric double layer constitute a colloidal crystal having a structure, e.g., face-centered cubic (FCC), body-centered cubic (BCC) and/or close-packed hexagonal (HCP), by using long range self-assembly. As illustrated in FIGS. 5B and 5C, a distance between the colloid particles 10 in the colloidal crystal may be controlled according to concentration of the colloid particles 10, and the concentration of the colloid particles 10 may be modified according to a zeta-potential of the colloid particles 10 or an ionic strength of a solvent. Also, because the concentration of the colloid particles 10 may be controlled by an electric stimulus, as will be described below, the colloidal crystal to be formed may be applied to a tunable photonic crystal device.

The colloidal crystal is a photonic crystal having a photonic bandgap in which, when light is irradiated from an external source onto the colloidal crystal, light having a predetermined or given wavelength among the light from an external source is reflected from the colloidal crystal due to constructive interference and the remaining lights having the remaining wavelengths transmit the colloidal crystal due to periodicity of the crystal. For example, the colloid particles 10 may have the size of about 50 to 200 nm so as to have a photonic bandgap in a visible light band.

The colloid particles 10 according to example embodiments may have a zeta-potential in the range of −150 to −30 mV or +30 to +150 mV so that the colloid particles 10 are not precipitated in a solvent but are maintained in a stable state of the colloidal crystal.

Figure 6:
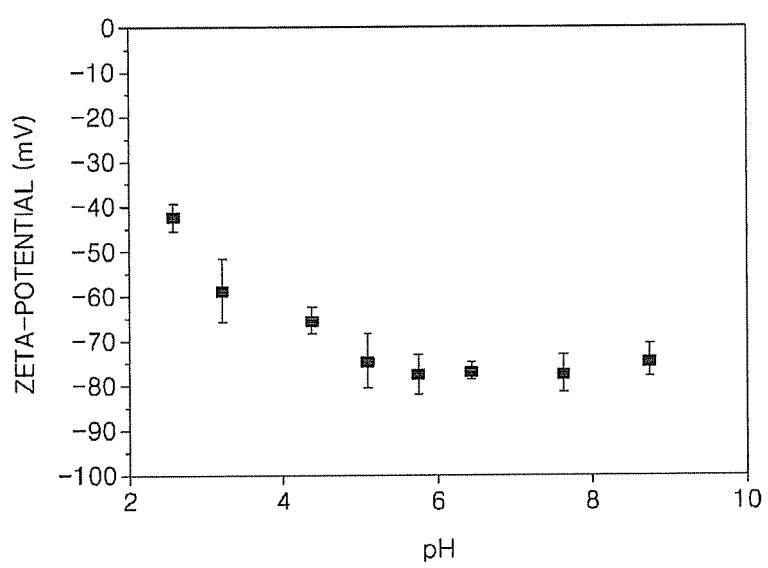
FIG. 6 is a graph showing a change in zeta-potential according to pH value of colloid particle dispersion when a content of methyl methacrylates (MMA) is 0% when the PS/PMMA particles are prepared by the methods illustrated in FIGS. 1, 2, and 3.

FIG. 6 is a graph showing a change in zeta-potential according to pH value of colloid particle dispersion when the content of methyl methacrylates (MMA) is 0% in the above-described preparation example. Referring to FIG. 6, the colloid particles obtained in the above-described preparation example have a negative charge and have a zeta-potential of about −40 mV to −80 mV. In particular, the colloid particles obtained in the above-described preparation example may have a surface negative charge with a zeta-potential that is close to −80 mV when pH of the solvent is neutral.

As described above, because the colloid particles according to example embodiments are highly charged, due to a repulsive force between the colloid particles, the colloidal crystal having a photonic crystal structure may be stably formed by using long range self-assembly.

Figure 7:
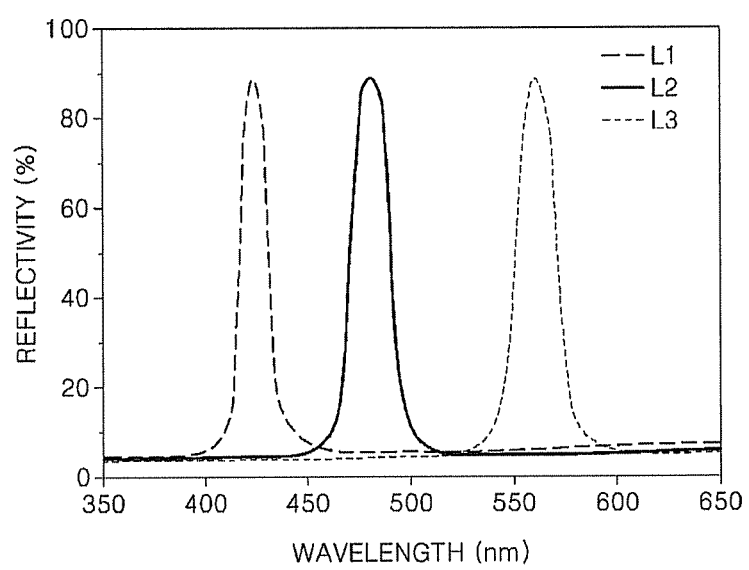
FIG. 7 is a graph showing a reflection spectrum when a content of MMA is modified when the PS/PMMA particles are prepared by using a method according to example embodiments.

FIG. 7 is a graph showing a reflection spectrum when the content of MMA is modified in the above-described preparation example. In FIG. 7, curves L1, L2, and L3 respectively correspond to a reflection spectrum when the content of MMA is 16.7%, 50%, and 66.7%. As described above, the size of the colloid particles may be optionally adjusted by modifying the feeding rate of monomers when the colloid particles are formed. When the content of MMA is modified as 16.7%, 50%, and 66.7%, respectively, as illustrated in FIG. 1, the size of a colloid particle to be formed decreases. Thus, it is clear from FIG. 7 that, as the size of the colloid particle decreases, the peak of the reflection spectrum gradually moves to the side of the graph representing a longer wavelength.

Figure 8:
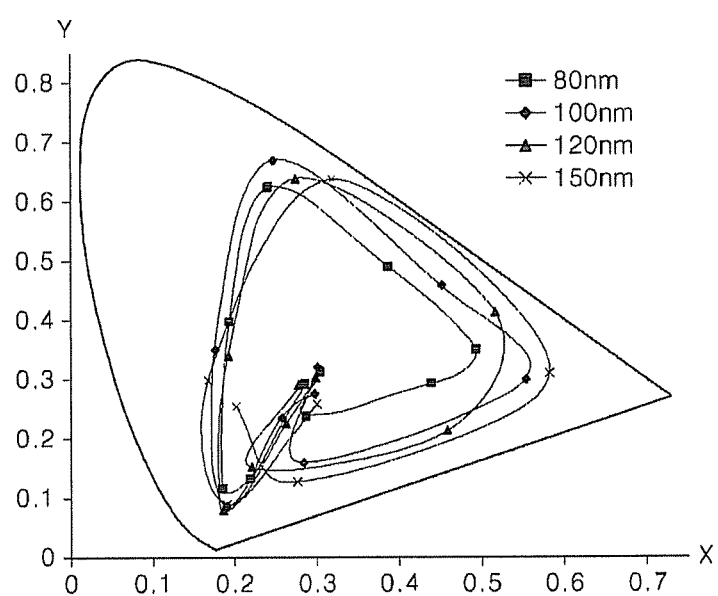
FIG. 8 is a graph showing a calculated result of a change in color coordinates according to a size of a colloid particle under aqueous dispersion.

FIG. 8 is a graph showing a calculated result of a change in color coordinates according to the size of a colloid particle under aqueous dispersion. Referring to FIG. 8, a desired reflection color may be obtained by modifying the size and concentration of the colloid particle.

FIGS. 7 and 8 represent that, when the colloid particle is applied to a display device, as will be described below, the wavelength band of reflected light may be controlled by properly selecting the size and concentration of the colloid particle.

Figure 9:
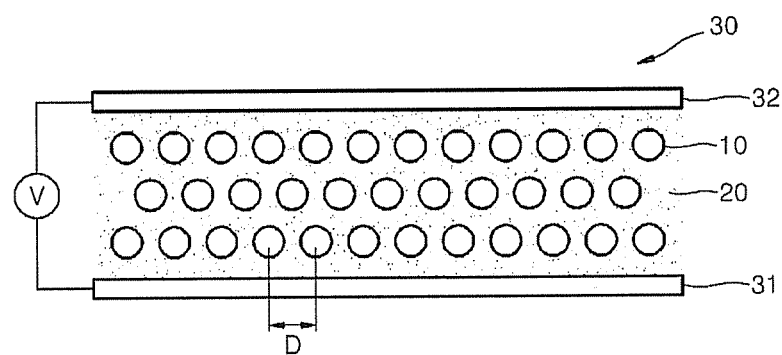
FIG. 9 schematically illustrates a tunable photonic crystal device according to example embodiments.
Figure 10A:
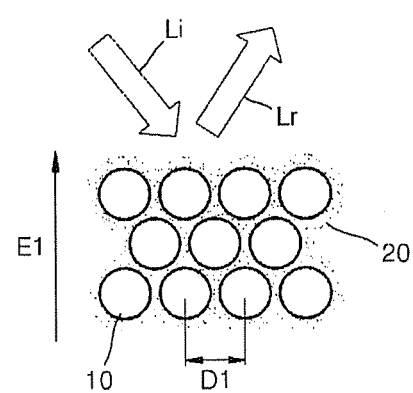
FIGS. 10A through 10C illustrate a change in distances of colloid particles when a voltage is applied to the tunable photonic crystal device illustrated in FIG. 9.
Figure 10B:
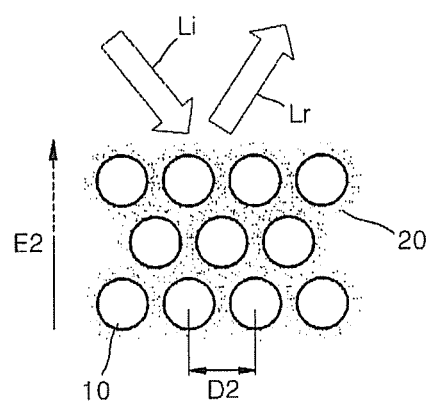
Figure 10C:
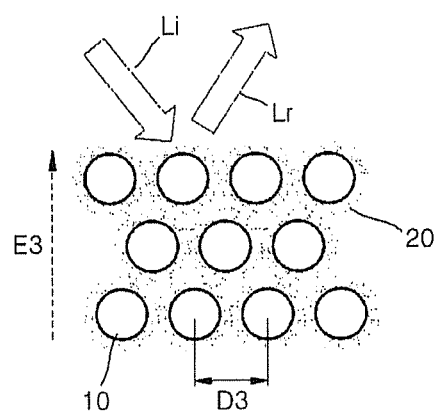

FIG. 9 schematically illustrates a tunable photonic crystal device 30 according to example embodiments. FIGS. 10A through 10C illustrate a change in distances of colloid particles 10 when a voltage V is applied to the tunable photonic crystal device 30 illustrated in FIG. 9.

Referring to FIG. 9, the tunable photonic device 30 modulates color of light Lr reflected from light from an external source Li in real-time and may include a colloid solution in which colloid particles 10 are dispersed in a solvent 20, and electrodes 31 and 32 that are applied with the voltage V to the colloid particles 10.

The colloid particles 10 and the solvent 20 may be monodisperse colloid particles and a solvent that are prepared using the methods illustrated in FIGS. 1, 2, and 3, and the colloid particles 10 may constitute photonic crystals by using long range self-assembly using the electric double layer.

The electrodes 31 and 32 may be spaced apart from each other by a predetermined or given distance, as illustrated in FIG. 9. The tunable photonic crystal device 30 may have a matrix structure in which a plurality of cells are arranged to which voltages are independently applied. In example embodiments, one of the electrodes 31 and 32 may be a pixel electrode that may be applied with an independent voltage, and the other one thereof may be common electrode. The pixel electrode and the common electrode may be arranged in an electrode structure that is used in a conventional image panel. The electrodes 31 and 32 may be formed as transparent electrodes.

In example embodiments, the tunable photonic crystal device 30 reflects light Lr having a predetermined or given wavelength among light from an external source Li and transmits the remaining lights having the remaining wavelengths. Alternatively, when an incident-side electrode, for example, 31, is formed as a transparent electrode and the other-side electrode, for example, 32, is coated with a light-absorbing material, the tunable photonic crystal device 30 may reflect light Lr having a predetermined or given wavelength among the light from an external source Li and absorb the remaining light having the remaining wavelengths.

When the voltage V is applied to the electrodes 31 and 32, an electric field is formed in a space between the electrodes 31 and 32, and the colloid particles 10 charged in the colloid solution are affected by an electric force generated by the electric field and pushed to one side due to electrokinetic phenomena. For example, the colloid particles 10 that are charged with a negative charge are moved to a positive electrode. When the colloid particles 10 are pushed to one side due to an external electric field and the concentration of the colloid particles 10 becomes higher, the colloid particles 10 are balanced by a repulsive force generated when the colloid particles 10 are charged. A distance between the colloid particles 10 may be defined by 'D' as shown in FIG. 9.

Thus, the colloid particles 10 have an ordered structure. When an electric field in FIGS. 10A through 10C decreases in the order of E1, E2, and E3, the concentration of the colloid particles 10 decreases, and a distance between the colloid particles 10 increases in the order of distances D1, D2, and D3. When a distance between the colloid particles 10 is modified, the photonic bandgap of the photonic crystals including the colloid particles 10 is tuned. Thus, a photonic stop band of the photonic crystals is also tuned. For example, a photonic bandgap that corresponds to the distance D1 may have a photonic stop band of a blue wavelength, and a photonic bandgap that corresponds to the distance D2 may have a photonic stop band of a green wavelength, and a photonic bandgap that corresponds to the distance D3 may have a photonic stop band of a red wavelength. For example, when a photonic crystal including the colloid particles 10 has a photonic stop band of a blue wavelength, substantially 100% of blue light is reflected from the photonic crystal including the colloid particles 10, and light having the remaining wavelengths transmit the photonic crystal.

Figure 11:
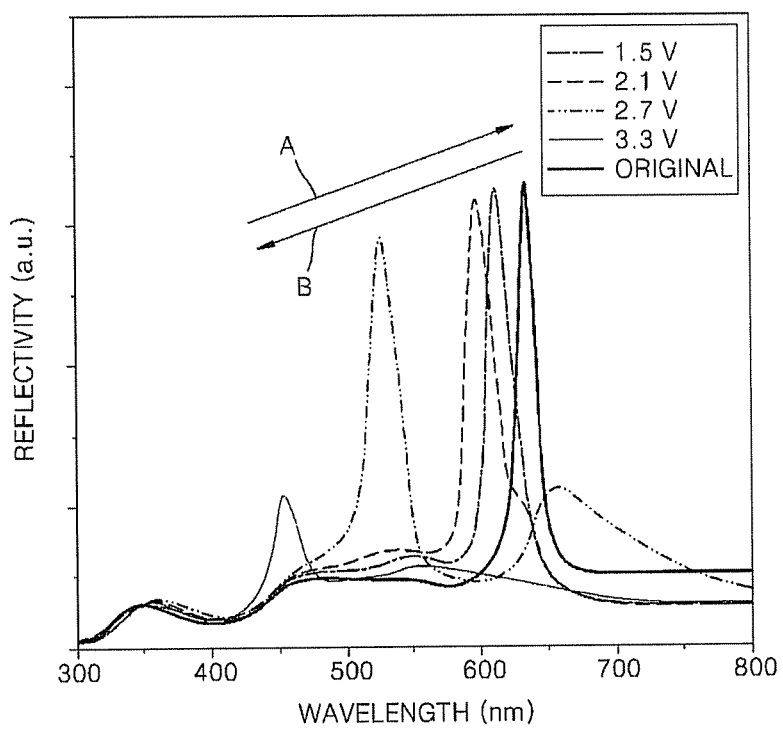
FIG. 11 is a graph showing an empirical result of movement of a peak of a reflection spectrum when a voltage is applied to the tunable photonic crystal device of FIG. 9.

FIG. 11 is a graph showing an empirical result of movement of a peak of a reflection spectrum when a voltage is applied to the tunable photonic crystal device 30 of FIG. 9. The colloid particles 10 of the tunable photonic crystal device 30 are the PS/PMMA particles prepared in the above-described preparation example, and the length of the electrodes 31 and 32 is 125 µm. Referring to FIG. 11, when a voltage is not applied to the tunable photonic crystal device 30, a peak wavelength of the reflection spectrum is about 60 nm.

When a voltage is gradually increased to 1.5V, 2.1V, 2.7V, and 3.3V, the peak wavelength of the reflection spectrum is continuously changed from 650 nm (red) to 450 nm (blue). In contrast, when the voltage is gradually decreased, the peak wavelength of the reflection spectrum is shifted from blue to red (direction A) and is returned to its original state. That is, FIG. 11 illustrates that the photonic stop band of the tunable photonic crystal device 30 may be continuously moved from a blue visible light band to a red visible light band according to the magnitude of the voltage applied to the tunable photonic crystal device 30.

Figure 12:
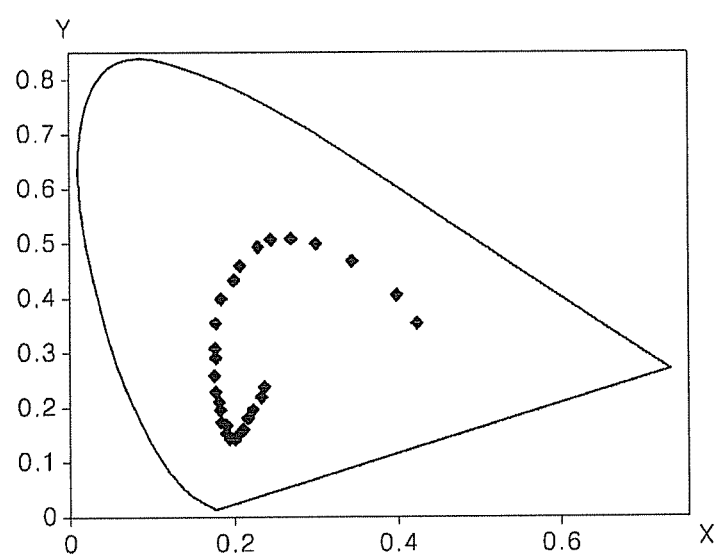
FIG. 12 is a graph showing an empirical result of a change in color coordinates when a voltage is applied to the tunable photonic crystal device of FIG. 9.

FIG. 12 is a graph showing an empirical result of a change in color coordinates when a voltage is applied to the tunable photonic crystal device 30 of FIG. 9. The colloid particles 10 of the tunable photonic crystal device 30 are the PS/PMMA particles prepared in the above-described preparation example, and the length of the electrodes 31 and 32 is 125 µm. Referring to FIG. 12, when the voltage applied to the tunable photonic crystal device 30 is changed from 0 to 3.3 V, a color coordinate in a color space is moved from red to blue and is additionally moved to white. Moving of the color coordinate to white may be understood to represent that the photonic stop band of the tunable photonic crystal device 30 is moved to an ultraviolet (UV) light band and the tunable photonic crystal device 30 is substantially transparent with respect to the visible light band.

A change in spectrum that the peak wavelength of the reflection spectrum is continuously moved from 650 nm (red) to 450 nm (blue). In addition, the reflectivity of reflected light Lr may be systematically controlled according to the voltage applied to the tunable photonic crystal device 30.

Figure 13:
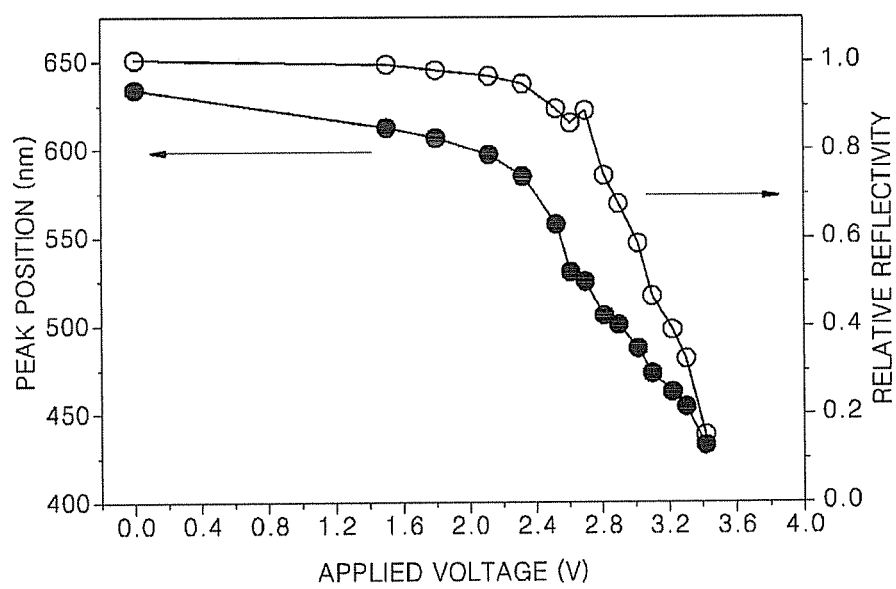
FIG. 13 is a graph showing a peak position and a change in intensity when a voltage is applied to the tunable photonic crystal device of FIG. 9.

A peak position and a change in reflectivity are plotted against applied voltage as illustrated in FIG. 13. When the applied voltage V is continuously changed, color of the reflected light Lr is continuously moved from blue to red in the color space, e.g., so as to include all visible light regions. A wavelength band of the reflected light Lr may be in the range from UV light to red, from blue to UV light, or from UV light to infrared rays according to the size of the colloid particles 10, the type of the solvent 20, and the magnitude of the applied voltage V.

As illustrated in FIGS. 11 through 13 described above, the tunable photonic crystal device 30 of FIG. 9 may reflect full color of light from blue to red according to the magnitude of the applied voltage V in a tunable manner, and furthermore, may reflect light in a relatively wide region including a visible light band from UV light to infrared rays in a tunable manner. Thus, the tunable photonic crystal device 30 of FIG. 9 may be used as a full-color reflection type display device or a tunable color filter having a visible light band as a photonic stop band. The tunable photonic crystal device 30 may be applied to other devices, e.g., a wavelength variable laser, a sensor, e-skin, and/or an indicator.

Figure 14:
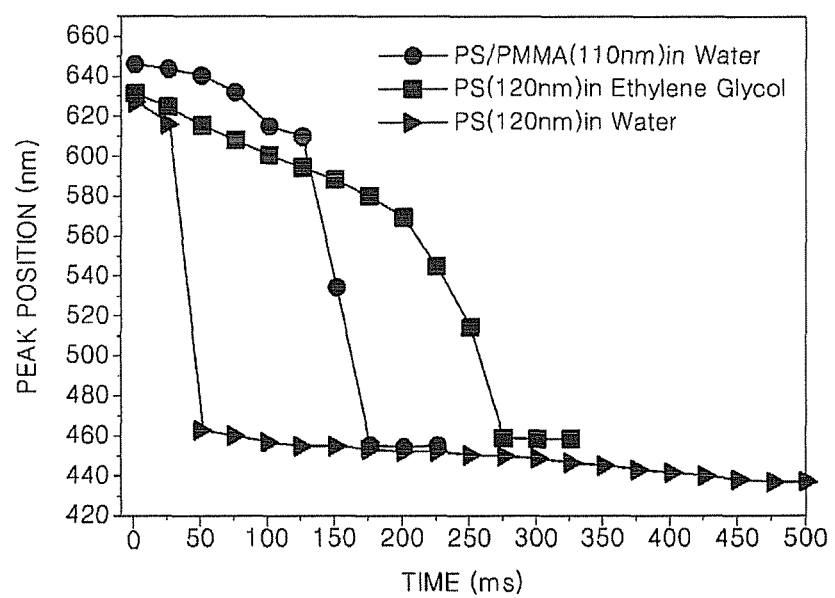
FIG. 14 is a graph showing an empirical result of a switching speed at which color of light is changed when a voltage is applied to the tunable photonic crystal device of FIG. 9 when a type of a colloid particle and a type of a solvent are modified in the tunable photonic crystal device of FIG. 9.

FIG. 14 is a graph showing an empirical result of a switching speed at which the color of light is changed when a voltage is applied to, and when a type of a colloid particle and a type of a solvent are modified, in the tunable photonic crystal device 30 of FIG. 9. The length of the electrodes 31 and 32 of the tunable photonic crystal device 30 is 125 µm, and a voltage applied to the tunable photonic crystal device 30 is 3.2 V. Referring to FIG. 14, the switching speed is changed from 50 ms to 300 ms according to the type of a colloid particle and the type of a solvent in various ways. For example, a PS particle has about 50 ms of a switching time in an aqueous solution, and a PS/PMMA particle has about 175 ms of a switching time in the aqueous solution. In addition, the PS particle may have about 275 ms of a switching time in an ethylene glycol solution. The switching speed indicates that the tunable photonic crystal device 30 of FIG. 9 may be used in a display device for displaying an image in real-time. Furthermore, when the tunable photonic crystal device 30 is used as the display device, due to the characteristics of photonic crystals, visibility is improved, brightness is higher, and full-color can be realized in one pixel.

As described above, in the method of preparing a monodisperse particle and the monodisperse particle prepared by using the method according to example embodiments, the size of the monodisperse particle may be more easily controlled by controlling only the content of monomers when the monodisperse particle is formed. In the tunable photonic crystal device using a colloid crystal prepared by using the method according to example embodiments, a photonic bandgap may be tuned, and the tunable photonic crystal device may modulate color of reflected light in real-time, and thus may be applied to a display device that may realize full color in one pixel.

While the inventive concepts have been particularly shown and described with reference to example embodiments thereof, it will be understood by those of ordinary skill in the art that various changes in form and details may be made therein without departing from the spirit and scope of the following claims.

What is claimed is:

1. A method of preparing a monodisperse particle, the method comprising:
    mixing at least two types of monomers in a solvent, the at least two types of monomers including two of methyl methacrylates (MMA), ethyl methacrylates, butyl methacrylates, hydroxyethyl methacrylates, vinyl toluenes, styrenes, acrylamides, N-isopropyl acrylamides, hydroxyethyl acrylamides, isobutylmethyl acrylamides, and combinations thereof;
    placing an initiator in the solvent; and
    forming the monodisperse particle having a copolymer shape by polymerizing the at least two types of monomers, the particle having a size controlled by a content of the at least two types of monomers,
    wherein the forming forms the monodisperse particle to have a diameter in a range of about 50 to 200 nm.

2. The method of claim 1, wherein the forming forms the particle to constitute a colloid solution in the solvent, and a zeta-potential of the particle is in a range of one of about −150 to −30 mV, and about 30 to 150 mV.

3. The method of claim 2, wherein the forming forms the particle as a colloidal crystal that is arranged on the solvent in one of a face-centered cubic (FCC) structure, a body-centered cubic (BCC) structure, and a close-packed hexagonal (HCP) structure.

4. The method of claim 1, wherein the mixing mixes the at least two types of monomers in a polar solvent.

5. The method of claim 1, wherein the placing places one of ammonium persulfate $((NH_4)_2S_2O_8)$, potassium persulfate $(K_2S_2O_8)$, and sodium persulfate $(Na_2S_2O_8)$ in the solvent.

6. The method of claim 1, further comprising:
adding a surfactant to the solvent.

7. The method of claim 6, wherein the adding adds one of an anionic surfactant, a cationic surfactant and a zwitterionic surfactant to the solvent.

8. A monodisperse particle prepared by using a method of preparing a monodisperse particle, the method comprising:
mixing at least two types of monomers in a solvent, the at least two types of monomers including two of methyl methacrylates (MMA), ethyl methacrylates, butyl methacrylates, hydroxyethyl methacrylates, vinyl toluenes, styrenes, acrylamides, N-isopropyl acrylamides, hydroxyethyl acrylamides, isobutylmethyl acrylamides, and combinations thereof;
placing an initiator in the solvent; and
forming the monodisperse particle having a copolymer shape by polymerizing the at least two types of monomers, the particle having a size controlled by a content of the at least two types of monomers,
wherein the forming forms the monodisperse particle to have a diameter in a range of about 50 to 200 nm.

9. A tunable photonic crystal device comprising:
a colloid solution including colloid particles dispersed therein, the colloid particles constituting a photonic crystal and formed by polymerizing at least two of methyl methacrylates (MMA), ethyl methacrylates, butyl methacrylates, hydroxyethyl methacrylates, vinyl toluenes, styrenes, acrylamides, N-isopropyl acrylamides, hydroxyethyl acrylamides, isobutylmethyl acrylamides, and combinations thereof; and
electrodes configured to apply a voltage to the colloid particles,
wherein a photonic stop band of the photonic crystal is continuously tuned in at least a visible light band according to the voltage applied to the electrodes,
wherein the colloid particles have a diameter in a range of about 50 to 200 nm.

10. The tunable photonic crystal device of claim 9, wherein the electrodes are two electrodes spaced apart from each other, and
the colloid solution is between the two electrodes.

11. The tunable photonic crystal device of claim 9, wherein the colloid particles have a zeta-potential in a range of one of about −150 to −30 mV and about 30 to 150 mV.

12. The tunable photonic crystal device of claim 9, wherein the photonic crystal has one of a face-centered cubic (FCC) structure, a body-centered cubic (BCC) structure and a close-packed hexagonal (HCP) structure.

13. The tunable photonic crystal device of claim 9, wherein a diameter of the colloid particles is controlled based on a content of the at least two monomers.

14. The tunable photonic crystal device of claim 9, wherein the colloid solution includes a polar solvent.

15. The tunable photonic crystal device of claim 9, wherein the tunable photonic crystal device is one of a tunable color filter having a visible light band as the photonic stop band, and a full-color reflection type display device that displays an arbitrary color in the visible light band.

16. A tunable photonic crystal device comprising:
a colloid solution including colloid particles dispersed therein; and
electrodes configured to apply a voltage to the colloid particles,
wherein each of the colloid particles includes an electric double layer, the colloid particles are charged, and the colloid particles constitute a photonic crystal, and a distance between the colloid particles varies according to the voltage applied to the electrodes.

* * * * *